(12) United States Patent
Moran

(10) Patent No.: US 10,087,344 B2
(45) Date of Patent: Oct. 2, 2018

(54) METHODS FOR SEALING MICROCELL CONTAINERS WITH PHENETHYLAMINE MIXTURES

(71) Applicant: E INK CORPORATION, Billerica, MA (US)

(72) Inventor: Isaac W. Moran, Maynard, MA (US)

(73) Assignee: E Ink Corporation, Billerica, MA (US)

( * ) Notice: Subject to any disclaimer, the term of this patent is extended or adjusted under 35 U.S.C. 154(b) by 42 days.

(21) Appl. No.: 15/336,841

(22) Filed: Oct. 28, 2016

(65) Prior Publication Data
US 2017/0121563 A1 May 4, 2017

Related U.S. Application Data

(60) Provisional application No. 62/248,338, filed on Oct. 30, 2015.

(51) Int. Cl.
*C09J 5/00* (2006.01)
*G02F 1/1339* (2006.01)
(Continued)

(52) U.S. Cl.
CPC ............ *C09J 5/00* (2013.01); *C08L 39/06* (2013.01); *C09J 165/00* (2013.01); *G02F 1/0107* (2013.01); *G02F 1/1339* (2013.01); *G02F 1/167* (2013.01); *C08G 2261/3221* (2013.01); *C09J 179/02* (2013.01); *C09J 2400/22* (2013.01); *C09J 2479/00* (2013.01);
(Continued)

(58) Field of Classification Search
CPC .. B65D 41/00; B65D 41/04; C08J 5/00; C08J 2323/20; C08K 2323/00; C08K 2323/20; B67C 3/22

USPC ..................................................... 53/425, 440
See application file for complete search history.

(56) References Cited

U.S. PATENT DOCUMENTS 3,978,063 A * 8/1976 Kishimoto ........... C07D 217/00
514/906
4,418,346 A 11/1983 Batchelder
(Continued)

FOREIGN PATENT DOCUMENTS

JP      2005315967      11/2005
KR      20110045965     5/2011

OTHER PUBLICATIONS

Cosgrove, G. Rees, M.D. et al; "Safety and Efficacy of a Novel Polyethylene Glcol Hydrogel Sealant for Watertight Dural Repair"; J Neurosurg; vol. 106; pp. 52-58; Jan. 2007. Jan. 1, 2007.
(Continued)

*Primary Examiner* — Gloria R Weeks
(74) *Attorney, Agent, or Firm* — Brian D. Bean

(57) ABSTRACT

A method for sealing a container having an opening by contacting the opening with a mixture including a phenethylamine and a first polymer, adding a fluid to be contained to the container, and then adding a second mixture, comprising a second polymer, whereupon an interaction between the first and second polymer mixtures result in a seal being formed over the opening, thereby containing the fluid. The first polymer is typically a water-swellable polymer and the second polymer is typically a hydrophilic polymer that will form an interpenetrating network with the swellable polymer.

19 Claims, 9 Drawing Sheets

(51) Int. Cl.
  *G02F 1/167* (2006.01)
  *G02F 1/01* (2006.01)
  *C09J 165/00* (2006.01)
  *C08L 39/06* (2006.01)
  *C09J 179/02* (2006.01)

(52) U.S. Cl.
  CPC ............... *G02F 2001/1672* (2013.01); *G02F 2001/1678* (2013.01); *G02F 2202/022* (2013.01); *G02F 2202/28* (2013.01)

(56) References Cited

U.S. PATENT DOCUMENTS

| | | | |
|---|---|---|---|
| 4,665,682 A * | 5/1987 | Kerins | B29C 49/0005 264/37.31 |
| 5,665,477 A | 9/1997 | Meathrel | |
| 5,872,552 A | 2/1999 | Gordon, II | |
| 5,930,026 A | 7/1999 | Jacobson | |
| 5,961,804 A | 10/1999 | Jacobson | |
| 6,017,584 A | 1/2000 | Albert | |
| 6,130,774 A | 10/2000 | Albert | |
| 6,144,361 A | 11/2000 | Gordon, II | |
| 6,172,798 B1 | 1/2001 | Albert | |
| 6,184,856 B1 | 2/2001 | Gordon, II | |
| 6,225,971 B1 | 5/2001 | Gordon, II | |
| 6,241,921 B1 | 6/2001 | Jacobson | |
| 6,271,823 B1 | 8/2001 | Gordon, II | |
| 6,502,369 B1 * | 1/2003 | Andison | B65B 3/022 53/275 |
| 6,506,577 B1 | 1/2003 | Deming | |
| 6,630,818 B1 | 10/2003 | Comer | |
| 6,664,944 B1 | 12/2003 | Albert | |
| 6,672,921 B1 | 1/2004 | Liang | |
| 6,788,449 B2 | 9/2004 | Liang | |
| 6,864,875 B2 | 3/2005 | Drzaic | |
| 6,922,276 B2 | 7/2005 | Zhang et al. | |
| 6,930,818 B1 | 8/2005 | Liang | |
| 6,933,098 B2 | 8/2005 | Chan-Park | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner | |
| 7,046,228 B2 | 5/2006 | Liang | |
| 7,075,502 B1 | 7/2006 | Drzaic | |
| 7,116,318 B2 | 10/2006 | Amundson et al. | |
| 7,167,155 B1 | 1/2007 | Albert et al. | |
| 7,279,064 B2 | 10/2007 | Daniel | |
| 7,312,784 B2 | 12/2007 | Baucom et al. | |
| 7,339,715 B2 | 3/2008 | Webber et al. | |
| 7,361,275 B2 * | 4/2008 | Wien | C02F 1/004 210/638 |
| 7,411,719 B2 | 8/2008 | Paolini, Jr. et al. | |
| 7,420,549 B2 | 9/2008 | Jacobson | |
| 7,453,445 B2 | 11/2008 | Amundson | |
| 7,535,624 B2 | 5/2009 | Amundson et al. | |
| 7,561,324 B2 | 7/2009 | Duthaler et al. | |
| 7,622,533 B2 | 11/2009 | Lee | |
| 7,622,550 B2 | 11/2009 | Cha | |
| 7,667,684 B2 | 2/2010 | Jacobson et al. | |
| 7,791,789 B2 | 9/2010 | Albert | |
| 7,839,564 B2 | 11/2010 | Whitesides et al. | |
| 7,854,104 B2 * | 12/2010 | Cronin | B65D 47/243 206/219 |
| 7,910,175 B2 | 3/2011 | Webber | |
| 7,943,703 B2 | 5/2011 | Shull | |
| 7,952,790 B2 | 5/2011 | Honeyman | |
| 7,956,841 B2 | 6/2011 | Albert | |
| 8,009,348 B2 | 8/2011 | Zehner | |
| 8,031,392 B2 | 10/2011 | Hiji | |
| 8,040,594 B2 | 10/2011 | Paolini, Jr. | |
| 8,054,526 B2 | 11/2011 | Bouchard | |
| 8,098,418 B2 | 1/2012 | Paolini, Jr. | |
| 8,213,076 B2 | 7/2012 | Albert | |
| 8,227,628 B2 | 7/2012 | Messersmith | |
| 8,283,384 B2 | 10/2012 | Stewart | |
| 8,293,867 B2 | 10/2012 | Messersmith | |
| 8,319,759 B2 | 11/2012 | Jacobson | |
| 8,361,356 B2 * | 1/2013 | Zang | C08L 51/006 264/4.1 |
| 8,363,299 B2 | 1/2013 | Paolini, Jr. | |
| 8,441,714 B2 | 5/2013 | Paolini, Jr. | |
| 8,441,716 B2 | 5/2013 | Paolini, Jr. | |
| 8,466,852 B2 | 6/2013 | Drzaic | |
| 8,541,060 B2 | 9/2013 | Messersmith | |
| 8,567,164 B2 * | 10/2013 | Thomasset | B65D 1/0207 426/401 |
| 8,576,470 B2 | 11/2013 | Paolini, Jr. | |
| 8,576,476 B2 | 11/2013 | Telfer | |
| 8,593,721 B2 | 11/2013 | Albert | |
| 8,605,354 B2 | 12/2013 | Zhang | |
| 8,652,565 B2 * | 2/2014 | Komatsu | G02F 1/167 359/296 |
| 8,717,664 B2 | 5/2014 | Wang | |
| 8,797,634 B2 | 8/2014 | Paolini, Jr. | |
| 8,830,559 B2 | 9/2014 | Honeyman | |
| 8,873,129 B2 | 10/2014 | Paolini, Jr. | |
| 8,902,153 B2 | 12/2014 | Bouchard | |
| 8,907,050 B2 | 12/2014 | Saleh | |
| 8,911,831 B2 | 12/2014 | Messersmith | |
| 8,917,439 B2 | 12/2014 | Wang | |
| 8,964,282 B2 | 2/2015 | Wang | |
| 8,988,762 B2 | 3/2015 | Shin, II et al. | |
| 8,999,452 B2 | 4/2015 | Messersmith | |
| 9,074,082 B2 * | 7/2015 | Wang | C08L 23/0815 |
| 9,170,467 B2 | 10/2015 | Whitesides | |
| 9,199,441 B2 | 12/2015 | Danner | |
| 9,293,511 B2 | 3/2016 | Jacobson | |
| 2002/0188053 A1 | 12/2002 | Zang | |
| 2003/0087338 A1 | 5/2003 | Messersmith | |
| 2005/0288398 A1 | 12/2005 | Messersmith | |
| 2008/0036960 A1 | 2/2008 | Ding | |
| 2008/0043318 A1 | 2/2008 | Whitesides | |
| 2008/0048970 A1 | 2/2008 | Drzaic | |
| 2008/0171012 A1 | 7/2008 | Messersmith | |
| 2008/0247984 A1 | 10/2008 | Messersmith | |
| 2009/0036611 A1 | 2/2009 | Wilker | |
| 2009/0225398 A1 | 9/2009 | Duthaler | |
| 2009/0230079 A1 * | 9/2009 | Smolko | B65D 41/0442 215/261 |
| 2010/0028718 A1 | 2/2010 | Oboodi | |
| 2010/0137902 A1 | 6/2010 | Lee | |
| 2010/0156780 A1 | 6/2010 | Jacobson | |
| 2011/0027250 A1 | 2/2011 | Messersmith | |
| 2011/0052788 A1 | 3/2011 | Messersmith | |
| 2011/0062108 A1 * | 3/2011 | Berthold | C08L 23/06 215/329 |
| 2011/0132864 A1 * | 6/2011 | Jamtvedt | C08K 5/0008 215/329 |
| 2012/0293858 A1 | 11/2012 | Telfer | |
| 2012/0326957 A1 | 12/2012 | Drzaic | |
| 2014/0054221 A1 | 2/2014 | Agnihotri | |
| 2014/0311673 A1 | 10/2014 | Zhao | |
| 2014/0340430 A1 | 11/2014 | Telfer | |
| 2015/0209846 A1 | 7/2015 | Aizanberg | |
| 2016/0083633 A1 * | 3/2016 | Desai | C08G 59/184 156/330 |
| 2016/0108185 A1 * | 4/2016 | Wang | C08F 2/001 525/240 |

OTHER PUBLICATIONS

Liu, Xiangsheng et al.; Mussel-Inspired Polydopamine: A Biocompatible and Ultastable Coating for Nanoparticles in Vivo; ACS Nano; vol. 7, No. 10; pp. 9384-9395; Sep. 8, 2013. Sep. 8, 2013.

Slafer, Warren D. et al.; "Continuous manufacturing of thin cover sheet optical media"; Proc. SPIE 1663, Optical Data Storage, 324; Aug. 13, 1992 Aug. 13, 1992.

Harvey, T. G.; "Replication techniques for micro-optics"; SPIE Proc. vol. 3099, pp. 76-82; 1997. Jan. 1, 1997.

(56) References Cited

OTHER PUBLICATIONS

Korean Intellectual Property Office; PCT/US2016/059253; International Search Report and Written Opinion; dated Feb. 2, 2017. Feb. 2, 2017.

* cited by examiner

Microcell structure

Coat structure with dopamine mixture

Fill microcells

Coat with sealing mixture

PP = photopolymer microcell; PR = photoresist microcell, STD = prior art sealant PP = photopolymer microcell

METHODS FOR SEALING MICROCELL CONTAINERS WITH PHENETHYLAMINE MIXTURES

RELATED APPLICATIONS

This application claims priority to U.S. Provisional Application No. 62/248,338, filed Oct. 30, 2016, which is incorporated herein by reference in its entirety.

FIELD OF THE INVENTION

The invention relates to methods for sealing containers using mixtures of phenethylamines, water swellable polymers, and hydrophilic polymers. In preferred embodiments, combinations of dopamine and swellable polymers, such as poly(vinylpyrrolindone), can be used to coat a wide variety of containers whereupon the container can be sealed by adding a second mixture comprising a hydrophilic polymer. In an embodiment, a mixture of phenethylamines and swellable polymers can be used to seal a microcell structure by interlocking a hydrophilic polymer coating to the microcell opening. Such microcells may be filled with an electrophoretic medium suitable for use in a display.

BACKGROUND

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;
(f) Methods for driving displays; see for example U.S. Pat. Nos. 7,012,600 and 7,453,445.
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 and 8,319,759; and U.S. Patent Application Publication No. 2012/0293858.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multi-color electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/0208338 describes a color display comprising an electrophoretic fluid which comprises one or two types of pigment particles dispersed in a clear and colorless or colored solvent, the electrophoretic fluid being sandwiched between a common electrode and a plurality of driving electrodes. The driving electrodes are kept at a certain distance in order to expose a background layer. U.S. Pat. No. 8,917,439 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and thirds type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below. See also U.S. Pat. No. 8,031,392 and U.S. Patent Publication No. 2014/0340430; the latter describes a full color display using three different types of particles in a colored fluid, but the presence of the colored fluid limits the quality of the white state which can be achieved by the display.

U.S. Pat. Nos. 5,961,804 and 5,930,026 describe microencapsulated electrophoretic image displays (EPIDs). These displays have a substantially two dimensional arrangement of microcapsules each containing an electrophoretic composition comprising a dielectric fluid with charged pigment particles suspended therein and the particles visually contrast with the dielectric solvent. The microcapsules can be formed by interfacial polymerization, in-situ polymerization or other known methods such as in-liquid curing or simple/complex coacervation. The microcapsules, after their formation, may be injected into a cell housing two spaced-apart electrodes, or they may be "printed" onto or coated on a transparent conductor film. The microcapsules may also be immobilized within a transparent matrix or binder that is itself sandwiched between the two electrodes.

An alternative method for encapsulating electrophoretic media was disclosed in U.S. Pat. Nos. 6,930,818 and 6,933,098. The cells of the improved EPID are formed from a plurality of microcells that are formed integrally with one another as portions of a structured two-dimensional array assembly. Each microcell of the array assembly is filled with a suspension or dispersion of charged pigment particles in a dielectric solvent, and sealed to form an electrophoretic cell.

Various adhesives are disclosed for use in sealing microcells, such as described in U.S. Pat. No. 8,361,356. For example, mixtures of thermoplastic polymers can be used to seal an electrophoretic medium into a microcell. Exemplary thermoplastic polymers include di-block, tri-block or multi-block copolymers represented by the formulas ABA or (AB)n in which A is styrene, methylstyrene, ethylene, or propylene; B is butadiene, isoprene, ethylene, propylene, butylene, dimethylsiloxane or propylene sulfide, wherein A and B cannot be the same in the formula. The number, n, is preferably 1-10. Representative copolymers include poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-dimethylsiloxane-b-styrene), poly((a-methylstyrene-b-isoprene), poly(a-methylstyrene-b-isoprene-b-a-methylstyrene), poly(a-methylstyrene-b-propylene sulfide-b-a-methylstyrene), and poly(a-methylstyrene-b-dimethylsiloxane-b-a-methylstyrene). Typically, the thermoplastic elastomer is dissolved in a solvent or solvent mixture that is immiscible with the electrophoretic display fluid, and exhibits a specific gravity equal to or less than that of the display fluid, so as to keep the elastomer from sinking below the electrophoretic fluid during manufacture. Low surface tension solvents are also preferred for the sealing composition because of their better wetting properties over the microcells filled with electrophoretic display fluid.

While these thermoplastic methods are suitable for some construction of microcell encapsulated media, they have some drawbacks. In particular, the thermoplastic polymers may be dissolved by the electrophoretic medium over time, resulting in leaking electrophoretic media and decreased performance by the electrophoretic medium due to trace levels of dissolved thermoplastics. This problem may be counteracted by increasing the hydrophilicity of the thermoplastics, thereby discouraging solvation of the thermoplastics by the electrophoretic media. Such modifications can be achieved by changing functional groups or blocks in the thermoplastic monomers. However, increasing the hydrophilicity decreases adhesion of the thermoplastic to the microcell material, which is also, typically, a thermoplastic polymer. The decreased adhesion may result in delamination of the encapsulated media in the final display.

SUMMARY OF INVENTION

The invention provides a widely-applicable method for sealing a container having an opening, and one well-suited for sealing containers with small openings such as the microcell structures described in the Background. In general, the method involves contacting the opening with a mixture including a phenethylamine and a first polymer, and then adding a fluid to be contained to the container. After adding the fluid, a second mixture, comprising a second polymer, is introduced, whereupon the interactions between the first and second polymer mixtures result in a seal being formed over the opening, thereby containing the fluid. Typically, the phenethylamine in the first mixture is dopamine or a phenethylamine with a structure similar to dopamine, such as epinephrine, phenylephrine, norepinephrine, or 3,4-dihydroxyphenylalanine. The first polymer in the first mixture is typically a polymer that swells in an aqueous environment, such as a pyrrolidone, a polysaccharide, a collagen, a polyamide, a polyester, an acrylate, a polyurethane, a polyether, e.g., polyethylene glycol, or a polyvinyl alcohol. The second polymer is typically hydrophilic, such as cellulose, methylcellulose, polyethylene glycol, polyvinyl alcohol, an acrylic, or an acrylamide. When the first and second polymers interact, they form an interconnected network, e.g., via covalent bonding, crosslinking, intermingling, or interpenetrating. In many instances, where the opening is sufficiently small, it is unnecessary to provide a "lid" to cover the opening because a cured mixture of the first and second polymers provides sufficient structure to contain the fluid within the container.

The methods described in this application are sufficiently robust that the methods can be used to seal a variety of containers with a robust seal. In most instances, it is sufficient to clean the surfaces of the container (broadly referred to a substrate), coat a surface adjacent an opening with a first mixture including a phenethylamine and a first polymer, fill the container with a fluid to be contained within, and then introduce a second polymer mixture to seal the opening. In some embodiments, a physical barrier, e.g., a lid may also be used to seal the container. The methods can be used to seal containers constructed from a variety of materials, including metals, plastics, papers, and biological polymers such as collagen or cellulose.

BRIEF DESCRIPTION OF DRAWINGS

In FIGS. 5A and 5B a combination of top and bottom exposure is used, allowing the walls in one lateral direction to be cured by top photomask exposure, and the walls in another lateral direction to be cured bottom exposure through the opaque base conductor film;

DETAILED DESCRIPTION

Figure 1:
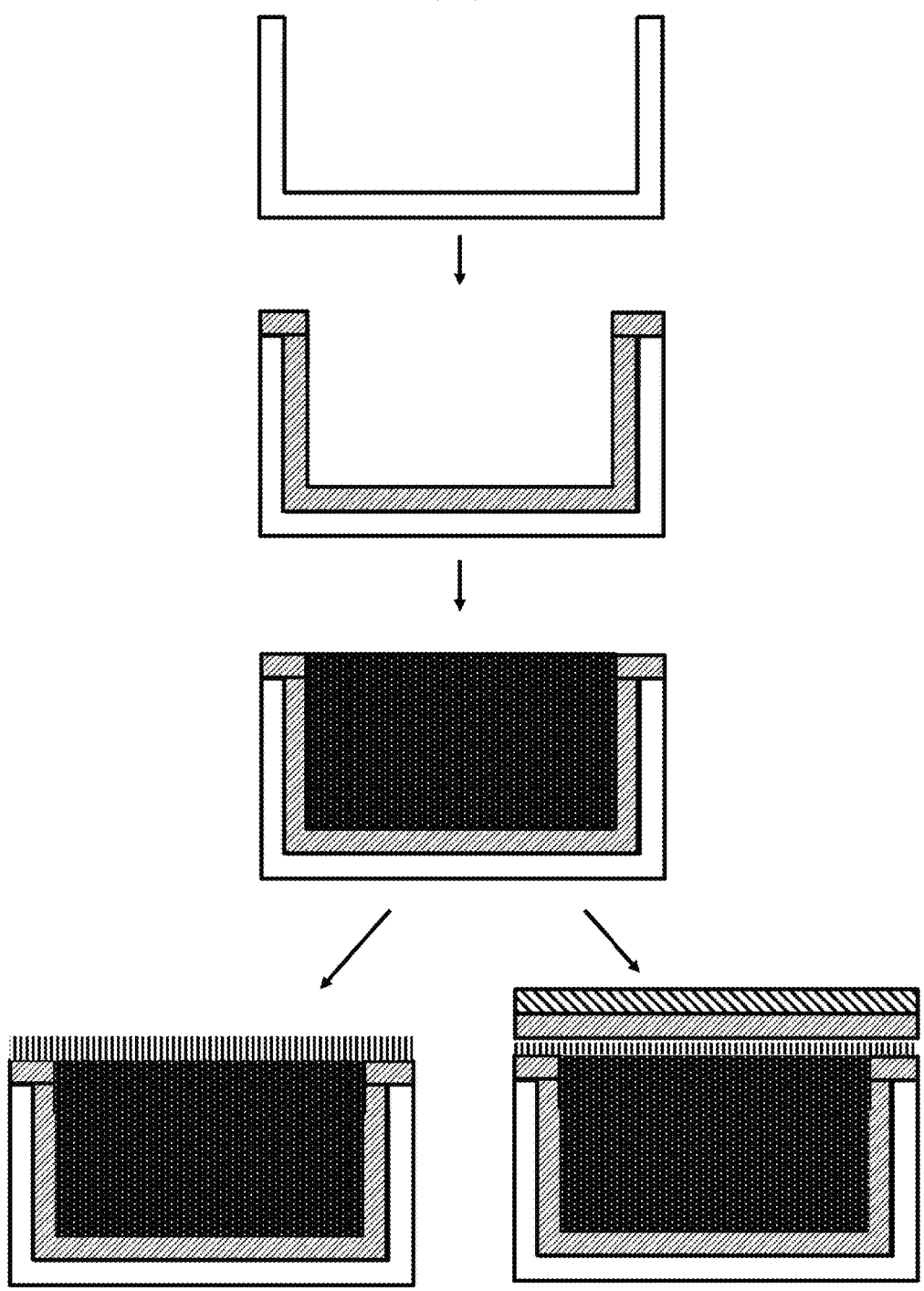
FIG. 1 is generalized depiction of a method of the invention, wherein a container is contacted with a first mixture comprising a phenethylamine and a first polymer, the container is filled, and the filled container subsequently sealed by contacting the filled container with a second mixture. In an alternate embodiment, a substrate (e.g., a lid) is also bonded to the opening.

As indicated above, the present invention provides a method for sealing a container having an opening. The method comprises contacting the opening with a mixture including a phenethylamine and a first polymer, and then adding a fluid to be contained to the container. After adding the fluid, a second mixture, comprising a second polymer, is introduced, whereupon the interactions between the first and second polymer mixtures result in a seal being formed over the opening, thereby containing the fluid. The first polymer is typically a water swellable polymer and the second polymer is typically a hydrophilic polymer that will form an interpenetrating network with the swellable polymer.

The invention uses a first mixture comprising a phenethylamine and a first polymer. In general, a phenethylamine suitable for use in the invention is a molecule of Formula 1,

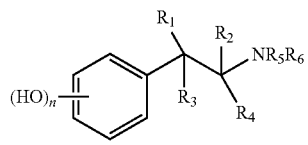

FORMULA 1 wherein n is 1 or 2, provided that if n is 2, the hydroxyl groups coupled to the aromatic ring are ortho to each other, and wherein each of $R_1$, $R_2$, $R_3$, $R_4$, $R_5$, and $R_6$ is independently selected from the group consisting of a thiol, a primary amine, a secondary amine, a nitrile, an aldehyde, an imidazole, an anazide, a halide, a hydrogen, a hydroxyl, a carboxylic acid, an aldehyde, a carboxylic ester or a carboxamide. For example, the phenethylamine may be dopamine, epinephrine, phenylephrine, norepinephrine, 3,4-dihydroxyphenylalanine, or 3,4-dihydroxyphenylacetic acid. For example, the phenethylamine may be of Formulas 2, 3, or 4,

FORMULA 2

FORMULA 3

FORMULA 4 provided that the hydroxyl groups coupled to the aromatic ring in Formula 2 are ortho to each other, and wherein each of $R_1$; $R_2$, $R_3$, $R_4$, $R_5$, and $R_6$ is independently selected from the group consisting of a thiol, a primary amine, a secondary amine, a nitrile, an aldehyde, an imidazole, anazide, a halide, a hydrogen, a hydroxyl, a carboxylic acid, an aldehyde, a carboxylic ester or a carboxamide. In some embodiments of Formulas 1-4, $R_1$ and $R_3$ are hydrogens. In some embodiments, $R_2$ and $R_4$ are hydrogens. In some embodiments, $R_5$ and $R_6$ are hydrogens. In some embodiments, $R_1$-$R_6$ are hydrogens. In some embodiments one of $R_1$-$R_4$ is a hydroxyl.

In most uses of the invention, the first mixture, used to coat a portion of the container adjacent an opening comprises a phenethylamine and a first polymer that swells with the introduction of water. For example, the first polymer may be pyrrolidones, polysaccharides, collagen, polyamides, polyesters, acrylates, polyethers, polyvinyl alcohols, and polyurethanes. In some embodiments, the first polymer is poly(vinylpyrrolidone) (PVP). Once a portion of the container is coated with the first mixture, the container is filled with a fluid that is to be contained within the container, and then the opening that is to be sealed is coated with a second polymer mixture. In some embodiments, the second polymer mixture comprises a hydrophilic polymer, such as cellulose, methylcellulose, polyethylene glycol, polyvinyl alcohols, an acrylic, a polyurethane, or an acrylamide. A container suitable for use with the invention may be constructed from a variety of materials, including metals, plastics, papers, and biological polymers such as collagen or cellulose. For example, an embossed set of containers may be constructed from acrylates, (meth)acrylates, vinylethers, esters, epoxides, polyethylene terephthalate (PET), high-density polyethylene (HDPE), polypropylene (PPE), or polyvinyl chloride (PVC). In some embodiments, each small container may be part of a network, e.g. a microcell, as shown in FIG. 2.

Figure 2:
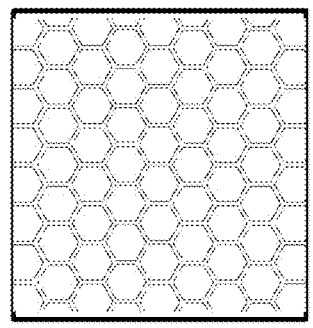
FIG. 2 shows an embodiment of the invention wherein microcells are filled with a medium and then sealed.
Figure 2:
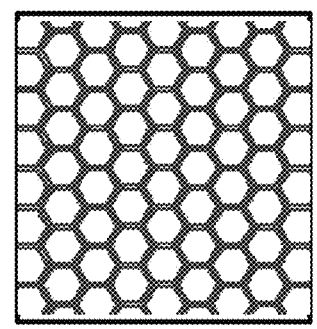
Figure 2:
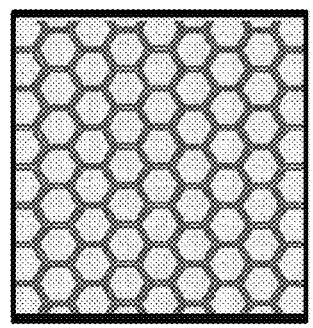
Figure 2:
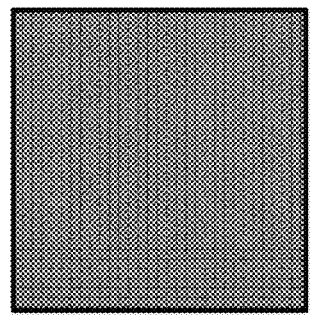
Figure 3:
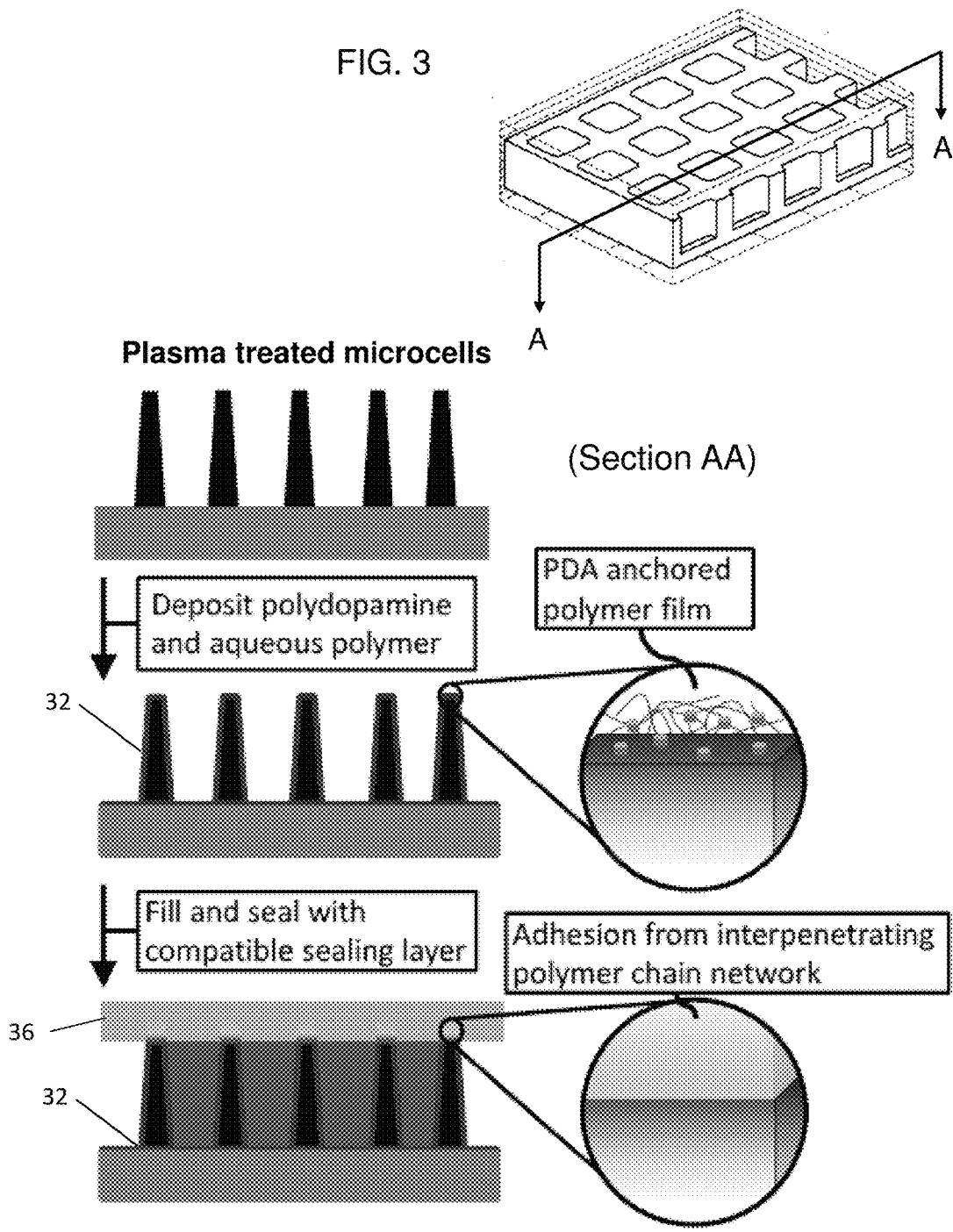
FIG. 3 shows cross sections of an embodiment of the invention wherein microcells are filled with a medium and then sealed.

The methods of using the invention are illustrated in FIGS. 1-3. In general, as shown in FIG. 1, the method involves providing a container (100) and then coating the container (100) with a first mixture comprising a phenethylamine and a first polymer mixture (120). Prior to coating, it may be beneficial to clean the container with soaps, organic solvents, acid, bases, ion etching, chemical etching or plasmas. Once coated, the first mixture may be dried and/or cured, as needed, to prepare the first mixture (120) for interaction with the fluid (140) that is to be held in the container. In preferred embodiments, the first polymer mixture (120) is immiscible with the fluid (140). Once the container (100) coated with the first polymer mixture (120) has been filled with the fluid (140), the filled container can be overcoated with a second polymer (160) that interacts with the first polymer mixture (120) to seal the fluid (140) inside the container (100). The filled container, overcoated with the second polymer may be cured or dried, such as using heat, radiation, ultraviolet light, or some combination thereof. In some embodiments, a lid (180) may also be used to seal the container. Typically, the lid (180) will also be coated with the first polymer mixture (120) whereby it, too, will interact with the second polymer (160) to create a strong seal to the container (100).

Of particular importance in the field of electrophoretic displays, the methods of the invention can be used to seal an electrophoretic medium within a microcell structure, whose fabrication is described below. As shown in FIG. 2, a microcell structure may be provided and the microcell structure is entirely coated with, or surface coated with, a first polymer mixture, for example a mixture of polydopamine and poly(vinylpyrrolidone). In some instances, the microcell structure is immersed in the first polymer mixture, in other instances, the first polymer mixture is only coated on the upper surface of the microcell structure, for example, using an applicator or via contact printing. Once the first polymer mixture has been deposited on the microcell structure, the microcells are filled, and the filled microcell structure is over-coated with a second polymer, such as a hydroxymethylcellulose solution, which creates a robust seal on the microcell structure. The same methods can be used to seal containers that are not microcells, however, such as capsules comprising medicaments, e.g., delayed release drug formulations, or blister packs for sealing tablets. Other applications include preparing arrays of fluids that can act as a chemical transducer which may be coupled to a detector to make a chemical sensor.

As detailed in FIG. 3, the final seal is formed due to interactions between the swellable polymers and the hydrophilic second polymer. The phenethylamine, for example polydopamine, anchors the swellable polymer, such as poly (vinylpyrrolidone), to the container structure, so that the final sealing layer, for example, hydroxymethylcellulose is bound to the container. The nature of the interaction between the swellable polymer and hydrophilic polymer need not be limited to a particular interaction, and is likely some combination of covalent bonding, van der Waals forces, and steric restriction as the final coating layer dries and/or cures.

To achieve a high-quality display, the sealing layer must have at least the following characteristics: (1) free of defects such as entrapped air bubble, pin holes, cracking or leaking, etc.; (2) good film integrity and barrier properties against the display fluid; and (3) good coating and adhesion properties. All of these requirements were achieved by using the methods described herein.

While seemingly simple, the disclosed sealing system is remarkably robust. Furthermore, the seal is the result of complex interactions between the various components. That is, samples sealed with only portions of the first polymer solution do not provide adequate sealing. For example, test microcells functionalized with $O_2$ plasma, alone, polydopamine (PDA), alone, poly(vinylpyrrolidone) (PVP), alone, or hydroxymethylcellulose (HPMC), alone, did not show good adhesive properties as determined via peel testing (see Example). When applied prior to filling the test microcells, none of these treatments increased the adhesion of a final HPMC layer to filled microcells.

In general, a variety of rapidly water swellable polymers may be used with the phenethylamine provided that the polymers are miscible with HPMC. For example, filled microcell samples, coated with PDA/PEO mixtures or PDA/HPMC mixtures, show increased adhesion to a HPMC seal coat, while samples coated with PDA/polystyrenesufflonate, which is not miscible with HPMC, did not.

Preparation of a Microcell Array for an EPID.

When used to construct an electrophoretic display, the substrate upon which the microcells are formed typically includes a display addressing array comprising a pre-formed conductor film, such as ITO conductor lines. The conductor film is coated with a radiation curable polymer precursor layer. The film and precursor layer are then exposed imagewise to radiation to form the microcell wall structure. Following exposure, the precursor material is removed from the unexposed areas, leaving the cured microcell walls bonded to the conductor film/support web. The imagewise exposure may be accomplished by UV or other forms of radiation through a photomask to produce an image or predetermined pattern of exposure of the radiation curable material coated on the conductor film. Although it is generally not required, the mask may be positioned and aligned with respect to the conductor film, i.e., ITO lines, so that the transparent mask portions align with the spaces between ITO lines, and the opaque mask portions align with the ITO material (intended for microcell cell floor areas).

The manufacture of a monochrome electrophoretic display (EPID) from a microcell assembly involves filling the microcells with a single pigment suspension composition, sealing the microcells, and finally laminating the sealed array of microcells with a second conductor film pre-coated with an adhesive layer. Alternatively, the microcell array may be prepared by a process including embossing a thermoplastic or thermoset precursor layer coated on a conductor film with a pre-patterned male mold, followed by releasing the mold. The precursor layer may be hardened by radiation, cooling, solvent evaporation, or other means during or after the embossing step. This novel micro-embossing method is disclosed in U.S. Pat. No. 6,630,818. Solvent-resistant, thermomechanically stable microcells having a wide range of size, shape, pattern and opening ratio can be prepared by either one of the aforesaid methods.

Preparation of a color EPID from a microcell assembly involves sequential selective opening and filling of predetermined microcell subsets. The process typically includes laminating or coating the pre-formed microcells with a layer of positively working photoresist, selectively opening a certain number of the microcells by imagewise exposing the positive photoresist, followed by developing the photoresist, filling the opened microcells with a colored electrophoretic fluid, and sealing the filled microcells by a sealing process. These steps may be repeated to create sealed microcells filled with electrophoretic fluids of different colors. Thus, the array may be filled with different colored compositions in predetermined areas to form a color EPID. Various known pigments and dyes are described below and provide a wide range of color options for both solvent phase and suspended particles.

Embossing.

Microcells suitable for use with the invention can be created with microembossing. A male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", SPIE Proc. Vol. 1663, pp. 324 (1992). The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76-82 (1997). Alternatively, the mold can be made by photomachining using plastics, ceramics or metals.

The male mold thus prepared typically has protrusions between about 1 to 500 microns, preferably between about 2 to 100 microns, and most preferred about 4 to 50 microns. The male mold may be in the form of a belt, a roller, or a sheet. For continuous manufacturing, the belt type of mold is preferred.

Microcells may be formed either in a batchwise process or in a continuous roll-to-roll process as disclosed in U.S. Pat. No. 6,933,098. The latter offers a continuous, low cost, high throughput manufacturing technology for production of compartments for use in electrophoretic or LCDs. Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring or the like, over the male mold. The dispenser may be moving or stationary. A conductor film is overlaid the UV curable resin. Examples of suitable conductor film include transparent conductor ITO on plastic substrates such as polyethylene terephthalate, polyethylene naphthalate, polyaramid, polyimide, polycycloolefin, polysulfone, epoxy and their composites. Pressure may be applied, if necessary, to ensure proper bonding between the resin and the plastic and to control the thickness of the floor of the microcells. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin which should have a good release property against the mold surface.

Photolithography.

Figure 4A:
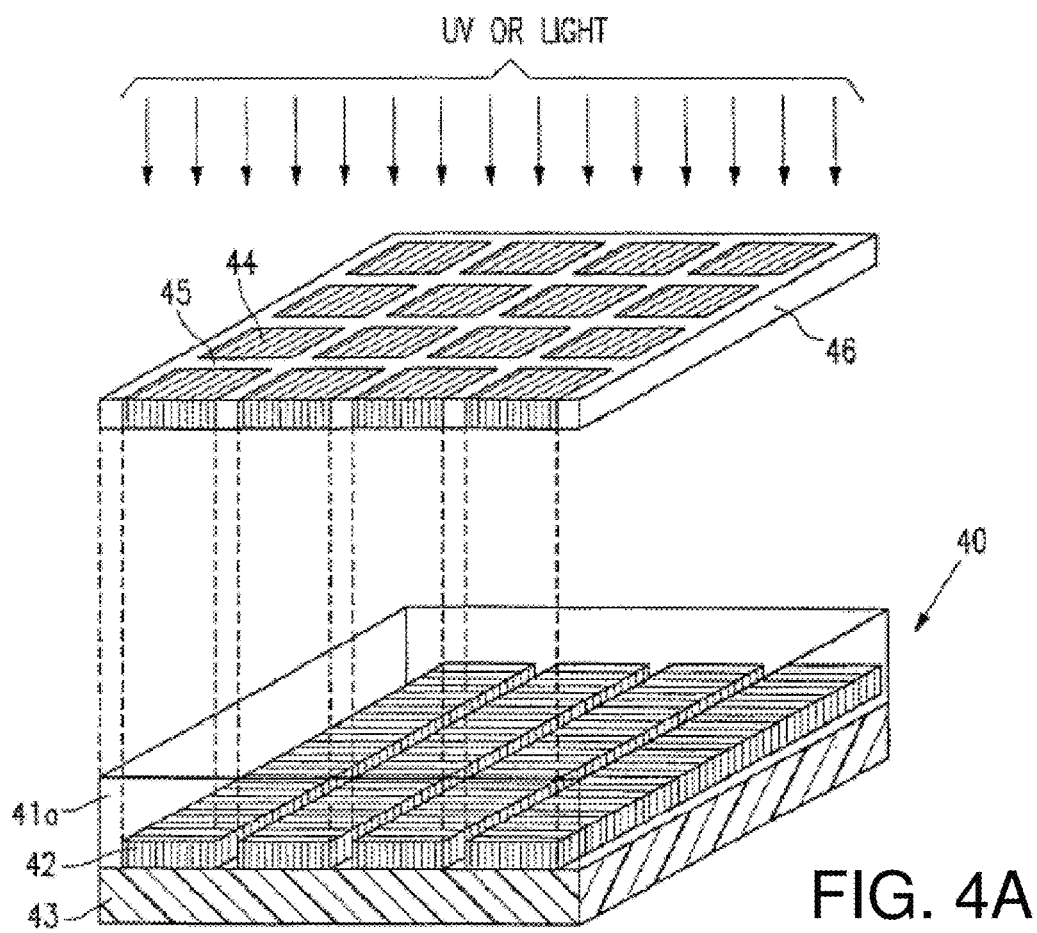
FIGS. 4A and 4B detail an embodiment in which microcells are fabricated using photolithographic exposure through a photomask of a conductor film coated with a thermoset precursor.
Figure 4B:
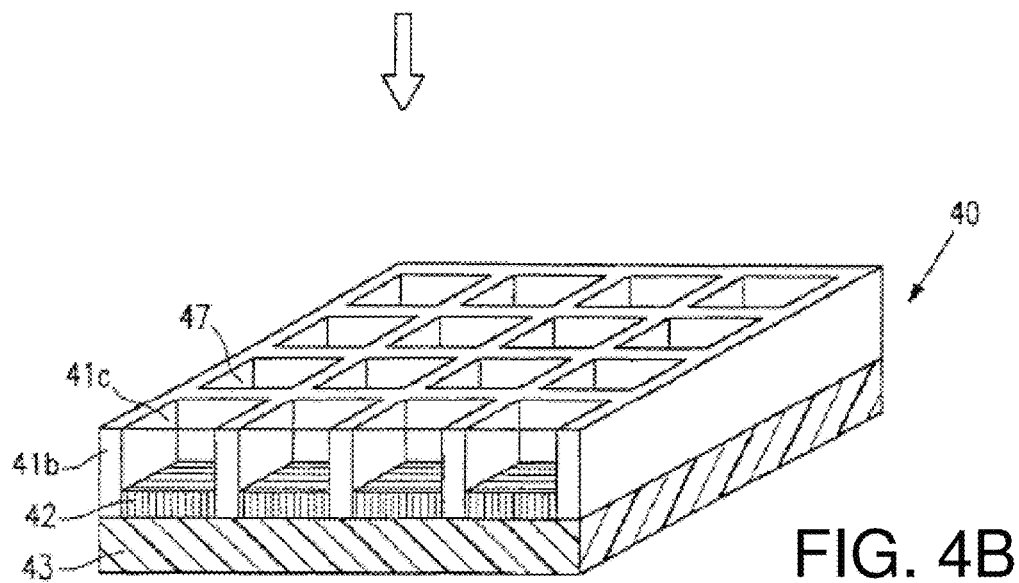

Microcells can also be produced using photolithography. Photolithographic processes for fabricating a microcell array are illustrated in FIGS. 4A and 4B. As shown in FIGS. 4A and 4B, the microcell array (40) may be prepared by exposure of a radiation curable material (41*a*) coated by known methods onto a conductor electrode film (42) to UV light (or alternatively other forms of radiation, electron beams and the like) through a mask (46) to form walls (41*b*) corresponding to the image projected through the mask (46). The base conductor film (42) is preferably mounted on a supportive substrate base web (43), which may comprise a plastic material.

In the photomask (46) in FIG. 4A, the dark squares (44) represent the opaque area and the space between the dark squares represents the transparent area (45) of the mask (46). The UV radiates through the transparent area (45) onto the radiation curable material (41*a*). The exposure is preferably performed directly onto the radiation curable material (41*a*), i.e., the UV does not pass through the substrate (43) or base conductor (42) (top exposure). For this reason, neither the substrate (43), nor the conductor (42), needs to be transparent to the UV or other radiation wavelengths employed.

As shown in FIG. 4B, the exposed areas (41*b*) become hardened and the unexposed areas (protected by the opaque area (44) of the mask (46)) are then removed by an appropriate solvent or developer to form the microcells (47). The solvent or developer is selected from those commonly used for dissolving or reducing the viscosity of radiation curable materials such as methylethylketone (MEK), toluene, acetone, isopropanol or the like. The preparation of the microcells may be similarly accomplished by placing a photomask underneath the conductor film/substrate support web and in this case the UV light radiates through the photomask from the bottom and the substrate needs to be transparent to radiation.

Imagewise Exposure.

Figure 5B:
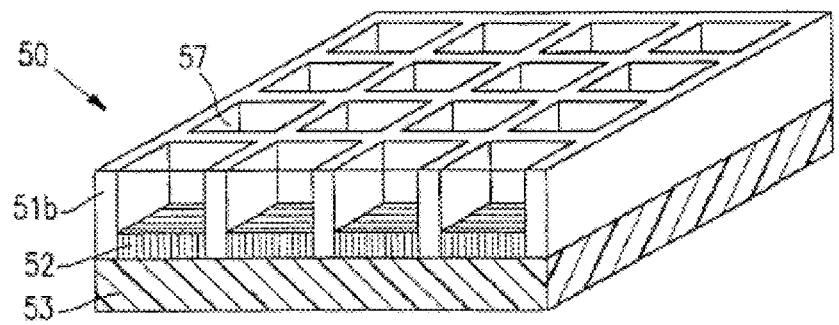
FIGS. 5A and 5B detail an alternate embodiment in which microcells are fabricated using photolithography.
Figure 5A:
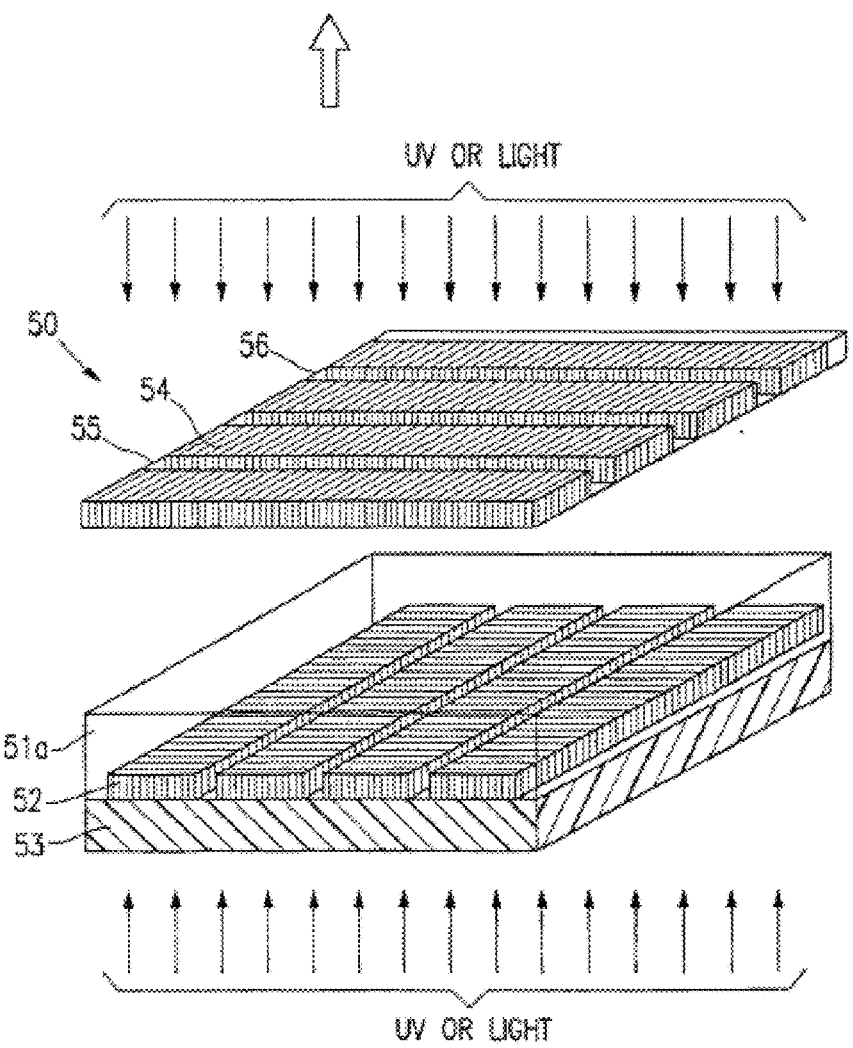

Still another alternative method for the preparation of the microcell array of the invention by imagewise exposure is illustrated in FIGS. 5A and 5B. When opaque conductor lines are used, the conductor lines can be used as the photomask for the exposure from the bottom. Durable microcell walls are formed by additional exposure from the top through a second photomask having opaque lines perpendicular to the conductor lines. FIG. 5A illustrates the use of both the top and bottom exposure principles to produce the microcell array (50) of the invention. The base conductor film (52) is opaque and line-patterned. The radiation curable material (51a), which is coated on the base conductor (52) and substrate (53), is exposed from the bottom through the conductor line pattern (52) which serves as the first photomask. A second exposure is performed from the "top" side through the second photomask (56) having a line pattern perpendicular to the conductor lines (52). The spaces (55) between the lines (54) are substantially transparent to the UV light. In this process, the wall material (51b) is cured from the bottom up in one lateral orientation, and cured from the top down in the perpendicular direction, joining to form an integral microcell (57). As shown in FIG. 5B, the unexposed area is then removed by a solvent or developer as described above to reveal the microcells (57).

The first and second polymer mixtures may include additional polymers, such as thermoplastic elastomers, which have good compatibility with the microcells and do not interact with the electrophoretic media. Examples of useful thermoplastic elastomers include ABA, and (AB)n type of di-block tri-block, and multi-block copolymers wherein A is styrene, α-methylstyrene, ethylene, propylene or norbornene; B is butadiene, isoprene, ethylene, propylene, butylene, dimethylsiloxane or propylene sulfide; and A and B cannot be the same in the formula. The number, n, is $\geq 1$, preferably 1-10. Particularly useful are di-block or hi-block copolymers of styrene or ox-methylstyrene such as SB (poly(styrene-b-butadiene)), SBS (poly(styrene-b-butadiene-b-styrene)), SIS (poly(styrene-b-isoprene-b-styrene)), SEBS (poly(styrene-b-ethylene/butylenes-b-stylene)) poly (styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methyl styrene), poly(α-methylstyrene-b-dimethylsiloxane-b-α-methylstyrene). A review of the preparation of the thermoplastic elastomers can be found in N. R. Legge, G Holden, and H. E. Schroeder ed., "Thermoplastic Elastomers", Hanser Publisher (1987). Commercially available styrene block copolymers such as Kraton D and G series (from Kraton Polymer, Houston, Tex.) are particularly useful. Crystalline rubbers such as poly(ethylene-co-propylene-co-5-methylene-2-norbornene) or EPDM (ethylene-propylene-diene terpolymer) rubbers such as Vistalon 6505 (from Exxon Mobil, Houston, Tex.) and their grafted copolymers have also been found very useful.

The thermoplastic elastomers may be dissolved in a solvent or solvent mixture which is immiscible with the display fluid in the microcells and exhibits a specific gravity less than that of the display fluid. Low surface tension solvents are preferred for the overcoating composition because of their better wetting properties over the microcell walls and the electrophoretic Solvents or solvent mixtures having a surface tension lower than 35 dyne/cm are preferred. A surface tension of lower than 30 dyne/cm is more preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane and decalin and the like), alkylbezenes (preferably mono- or di-$C_{1-6}$ alkyl benzenes such as toluene, xylene and the like), alkyl esters (preferably $C_{2-5}$ alkyl esters such as ethyl acetate, isobutyl acetate and the like) and $C_{3-5}$ alkyl alcohols (such as isopropanol and the like and their isomers). Mixtures of alkylbenzene and alkane are particularly useful.

In addition to polymer additives, the first or second polymer mixtures may also include wetting agents (surfactants). Wetting agents (such as the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn.) may also be included in the composition to improve the adhesion of the sealant to the microcells and provide a more flexible coating process. Other ingredients including crosslinking agents (e.g., bisazides such as 4,4'-diazidodiphenylmethane and 2,6-di-(4-azidobenzal)-4-methylcyclohexanone), vulcanizers (e.g., 2-benzothiazolyl disulfide and tetramethylthiuram disulfide), multifunctional monomers or oligomers (e.g., hexanediol, diacrylates, trimethylolpropane, triacrylate, divinylbenzene, diallylphthalene), thermal initiators (e.g., dilauroryl peroxide, benzoyl peroxide) and photoinitiators (e.g., isopropyl thioxanthone (ITX), Irgacure 651 and Irgacure 369 from Ciba-Geigy) are also highly useful to enhance the physicomechanical properties of the sealing layer by crosslinking or polymerization reactions during or after the overcoating process.

Figure 6A:
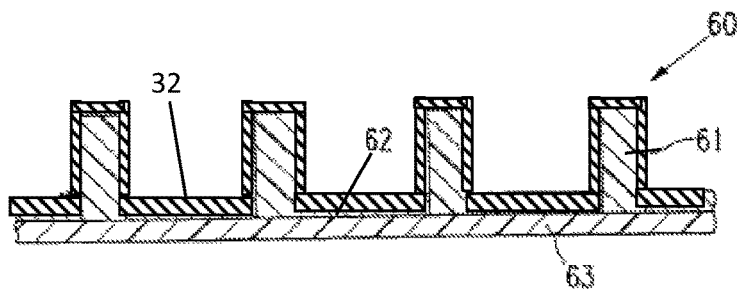
FIGS. 6A-6D illustrate the steps of assembling a monochrome display using the method of the invention.

The preferred process of preparing electrophoretic microcells is illustrated schematically in FIGS. 6A-6D. As shown in FIG. 6A, the microcell array (60) may be prepared by any of the alternative methods described above. The unfilled microcell array made by the methods described herein typically comprises a substrate web (63) upon which a base electrode (62) is deposited. The microcell walls (61) extend upward from the substrate (63) to form the open cells. Once the microcell structure is formed, the microcell structure is coated with a first polymer mixture comprising a phenethylamine (32). As shown in FIG. 6A, the mixture (32) coats the entire substrate web (63), as well as the base electrode (62). However, in alternative embodiments, only the tops of the microcell walls (61) may be coated, thereby reducing the amount of polymer mixture (32) that is used.

Figure 6B:
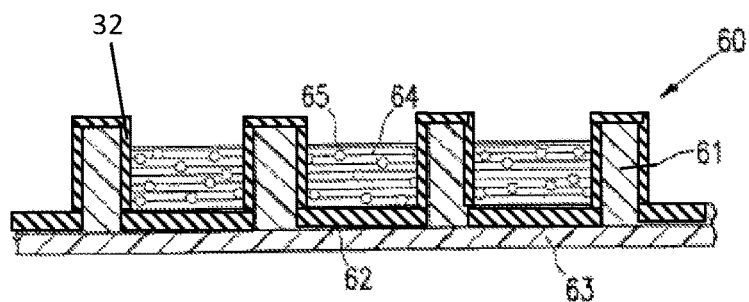

Once the microcells are coated with the polymer mixture (32), the microcells are filled with a suspension of charged pigment particles (65) in a medium (64). As shown in FIG. 6B, the polymer mixture (32) interacts with the suspension of charged pigment particles (65) in a medium (64). However, in alternative embodiments, where only the tops of the microcell walls are coated with the polymer mixture (32), (not shown) the suspension of charged pigment particles (65) in a medium (64) will not interact directly with the polymer mixture (32). In the example shown in FIGS. 6B-6D, the composition is the same in each cell, i.e., in a monochrome display. In carrying out the sealing process of the present invention, the microcells are preferably partially filled (to prevent overflow), which can be achieved by diluting the electrophoretic medium with a volatile solvent (such as acetone, methyl ethyl ketone, isopropanol, hexane, and perfluoro solvent FC-33 from 3M Co.,) and allowing the volatile solvent to evaporate. When a high boiling point perfluoro solvent such as HT-200 (from Ausimont Colo., Thorofare, N.J.) is used as the continuous phase of the display fluid, a perfluoro volatile solvent such as FC-33 is particularly useful to control the level of partial filling.

Figure 6C:
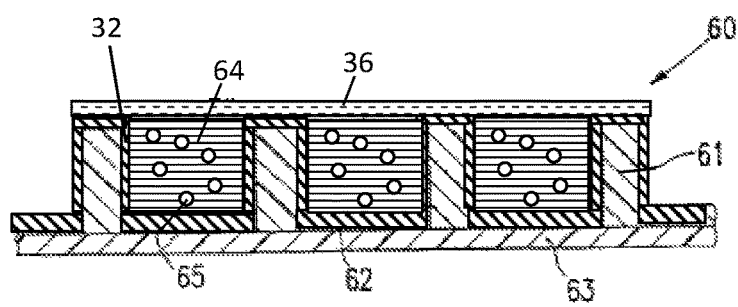

As shown in FIG. 6C, after filling, the microcells are sealed by applying a second mixture (36) that bonds with the first mixture (32). The second mixture (36) is typically overcooled onto the (mostly) filled microcells and dried on the display fluid, i.e., the suspension of charged pigment particles (65) in a medium (64). In some embodiments, the sealing process may involve exposure to heat, dry hot air, or UV radiation. It is notable that the second mixture (36) is mostly inert to the display fluid, however it bonds strongly with the first mixture (32) which includes a phenethylamine, as described above. Accordingly, the final microcell structure is mostly impervious to leaks and able to withstand flexing without delamination of the sealing layers (32) and (36).

Figure 6D:
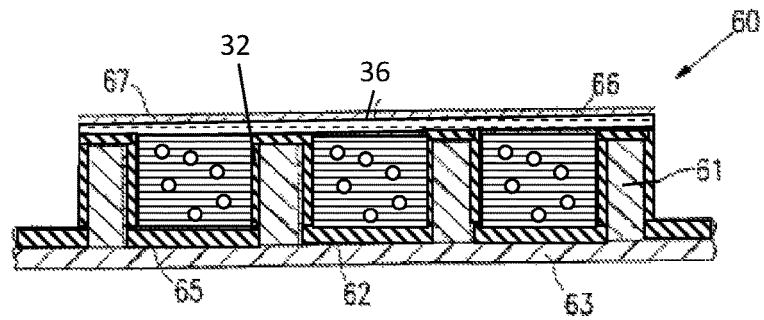

In some embodiments, as shown in FIG. 6D, the sealed array of electrophoretic microcell cells (60) is laminated with a second conductive film (67), preferably by pre-coating the conductor (67) with an adhesive layer which may be a pressure sensitive adhesive, a hot melt adhesive, or a heat, moisture, or radiation curable adhesive. The laminate adhesive may be post-cured by radiation such as UV through the top conductor film if the latter is transparent to the radiation. In other embodiments, an active matrix of electrodes may be bonded directly to the sealed array of electrophoretic microcell cells (60).

Figure 7A:
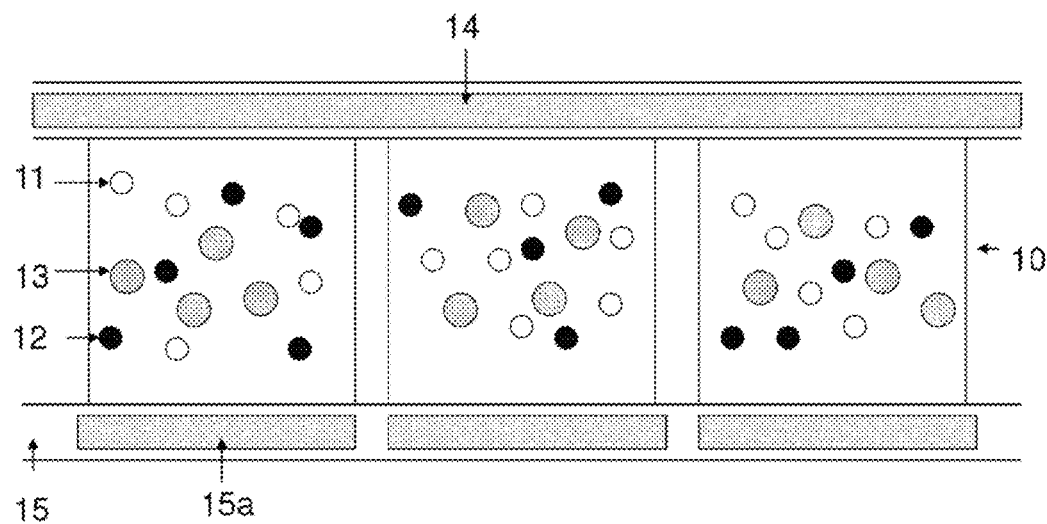
FIGS. 7A and 7B illustrate two embodiments of multicolor displays that can be fabricated using the methods of the invention.
Figure 7B:
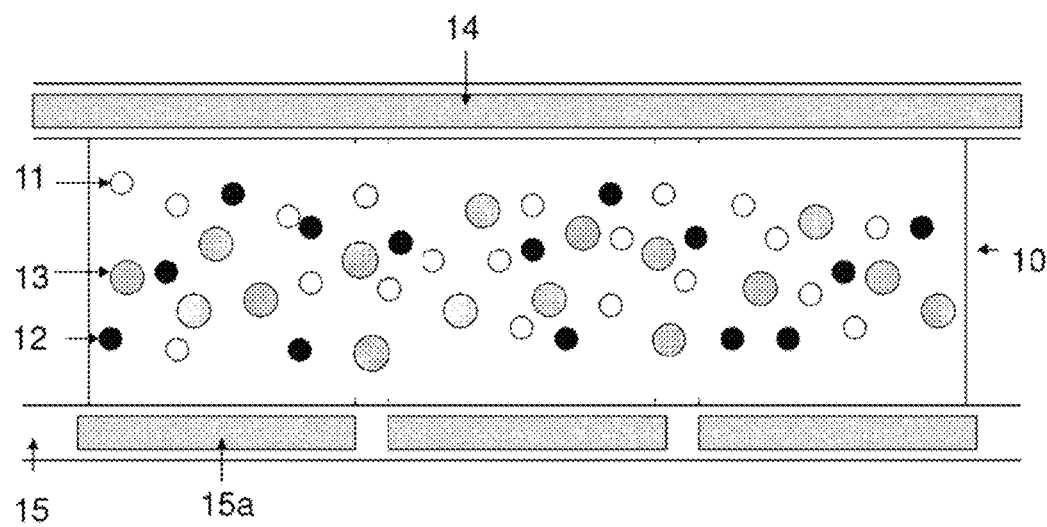

Similar techniques can be used to fabricate multi-color displays comprising electrically charged particles disposed in a fluid, wherein the particles move through the fluid under the influence of an electric field. For example, as shown in FIG. 7A, an electrophoretic display can be constructed having three types of pigment particles dispersed in a dielectric solvent or solvent mixture. For ease of illustration, the three types of pigment particles may be referred to as white particles (11), black particles (12) and colored particles (13), as shown in FIGS. 7A and 7B. However, it is understood that the scope of the invention broadly encompasses pigment particles of any colors, and more than three types of pigment particles may be included in the display. For example, a display may comprise red, green, and blue pigments, or cyan, yellow, and magenta pigments, or any combination of these colors.

In the embodiments of FIGS. 7A and 7B, the display fluid is sandwiched between two electrode layers. One of the electrode layers is a common electrode (14) which is a transparent electrode layer (e.g., ITO), spreading over the entire top of the display device. The other electrode layer (15) is a layer of sub-pixel electrodes (15a). The sub-pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions. In some embodiments, each microcell will be addressed by a sub-pixel electrode (15a). In these embodiments, a sub-pixel (15) may include a plurality of microcells, addressed by a plurality of sub-pixels, where each sub-pixel can make only a limited range of colors. When such sub-pixels are combined into a pixel, however, the pixel can provide a full color gamut. In alternative embodiments, e.g., as shown in FIG. 7B, a microcell may be addressable by more than one pixel electrode. The arrangement in 7B reduces the need to carefully co-register the electrodes and the microcell locations during assembly.

In some embodiments, the white particles (11) are formed from an inorganic pigment, such as $TiO_2$, $ZrO_2$, ZnO, $Al_2O_3$, $Sb_2O_3$, $BaSO_4$, $PbSO_4$ or the like. In some embodiments, the black particles (12), are formed from CI pigment black 26 or 28 or the like (e.g., manganese ferrite black spinel or copper chromite black spinel) or carbon black. Additional pigment particles may be of colors such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The percentages of the three types of pigment particles in the fluid may vary. For example, the black particle may take up about 0.1% to 10%, preferably 0.5% to 5% by volume of the electrophoretic fluid; the white particle may take up about 1% to 50%, preferably 5% to 15% by volume of the fluid; and the colored particle may take up about 2% to 20%, preferably 4% to 10% by volume of the fluid. There may be other particulate matters in the fluid which are included as additives to enhance performance of the display device, such as switching speed, imaging bistability and reliability.

The media solvent in which the pigment particles are suspended may be clear and colorless or colored. The solvent preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In some embodiments, two of the three types of pigment particles carry opposite charge polarities and the third type of pigment particles is slightly charged. For example, if the black particles are positively charged and the white particles are negatively charged, and then the colored pigment particles are slightly charged. In other words, in this example, the charge carried by the black and the white particles is much more intense than the charge carried by the colored particles. In addition, the third type of particles which carries a slight charge has a charge polarity which is the same as the charge polarity carried by either one of the other two types of the stronger charged particles.

The three types of pigment particles may have varying sizes. In one embodiment, one of the three types of pigment particles is larger than the other two types. It is noted that among the three types of pigment particles, the one type of particles which is slightly charged will preferably have the larger size. For example, both the black and the white particles are relatively small and their sizes (tested through dynamic light scattering) may range from about 50 nm to about 800 nm and more preferably from about 200 nm to about 700 nm, and in this example, the colored particles which are slightly charged, preferably are about 2 to about 50 times and more preferably about 2 to about 10 times larger than the black particles and the white particles.

EXAMPLES

Adhesion and Color Gamut Measurements in Microcell Devices Sealed with Polydopamine (PDA) and Poly(Vinylpyrrolidone) Mixtures Photo-patterned microcell substrates were prepared as discussed with respect to FIGS. 4A- and 4B and cut into strips with dimensions of 5×13 inches. (These microcells are referred to as photopolymer microcells "PP" below.) The microcell strips were plasma treated for 30 seconds with 100 W of 5 sccm 02 at 200 mTorr. After plasma treatment, the strips were curled with microcell openings facing inwards and placed inside a 1 L polypropylene (PP) bottle. A 200 ml solution of 4.76 wt % poly(vinylpyrrolidone) (PVP; 40,000 Mn) in DI $H_2O$ was buffered to pH=8.25 with tris(hydroxymethyl)aminomethane (TRIS). Polydopamine (PDA; 400 mg, solid), was added and allowed to dissolve for 1 to 3 min forming a light pink, clear, solution. The PVP/PDA solution was transferred to the 1 L PP bottle containing the microcell strip, sealed, and rolled overnight using a laboratory roller. After rolling, the brown PVP/PDA solution was poured off and the microcell strip was washed with 1 L DI $H_2O$ twice, rinsed with DI $H_2O$, and then dried in stream of $N_2$. The PVP/PDA treated microcell strips were then filled with an electrophoretic medium including colored pigments and sealed by applying a 2.5 wt/wt % aqueous solution of hydroxypropylmethylcellulose (HPMC) to the filled microcell strips. The sealed strips were then used as adhesion test samples measuring adhesion and 2×4 electro-optic pixels to evaluate color gamut.

The sealed microcells produced above were evaluated for the amount of peel force required to cause delamination using an Instron test rig configured for peel testing (Instron Corporation, Norwood, Mass.). The sealed PP microcells were also compared to PP microcells sealed in accordance with prior art methods, e.g., as described in U.S. Patent Publication No. 2007/0243332, which is incorporated by reference. This sealing method is denoted as "STD" in FIG. 8. For further comparison, microcells constructed from a single layer of a polyethylene terephthalate (PET), indium tin oxide (ITO), and dry film resist were also sealed using the PDA/PVP formulation described above. This alternative construction of microcells is referred to as photoresist "PR" in FIG. 8. The two types of microcells are notably different in that the PP microcells have a layer of photopolymer over the PET/ITO layer, whereas the PR microcells allow the PDA/PVP formulation to bond directly to the PET/ITO layer.

Figure 8:
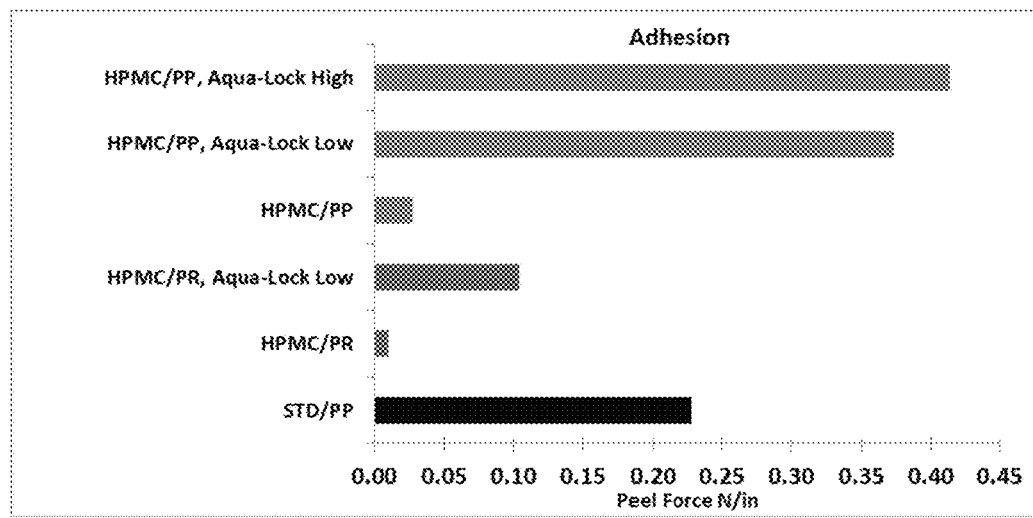
FIG. 8 compares the adhesion strength of various polymer combinations that can be used with methods of the invention.

FIG. 8 shows peel strength tests of microcell materials filled with colored electrophoretic media and sealed with the above methods, or using prior art methods. In FIG. 8, the top two bars (HPMC/PP, Aqua-Lock High and HPMC/PP, Aqua-Lock Low) represent PP microcells coated with PDA/PVP mixtures and then sealed with hydroxypropylmethylcellulose (HPMC). "High" and "Low" denote the concentration of PVP and PDA and the curing time, as shown in Table 1, below. The PDA/PVP mixture is labeled throughout the data with the moniker "Aqua-Lock."

TABLE 1

| Concentrations and cure times for PDA/PVP mixtures ("Aqua-Lock") | | | |
|---|---|---|---|
| | [PDA] | [PVP] | Cure Time |
| Low | 0.53 mM | 0.48% (wt/wt) | 1 hour |
| High | 2.11 mM | 4.76% (wt/wt) | 22 hours |

The smaller middle bars corresponds to sealing a PP microcell sample using only hydroxypropylmethylcellulose deposited onto filled microcells (HPMC/PP); sealing a PR microcell sample by coating with a Low PDA/PVP mixture and then sealing with HPMC (HPMC/PR, Aqua-Lock Low); sealing a PR microcell sample using only hydroxypropylmethylcellulose deposited onto filled microcells (HPMC/PR); and sealing a PP microcell sample using the methods of U.S. Patent Publication No. 2007/0243332, which is incorporated herein by reference.

Reviewing the data of FIG. 8, it is clear that there is a significant difference in the adhesive strength of an HPMC seal on a microcell when the microcell is coated with a polymer coating of the invention, e.g., a PDA/PVP mixture. Comparing HPMC/PP, Aqua-Lock High/Low to untreated samples (HPMC/PP), it is evident that treated samples were over 10 times more adhesive than un-treated samples. This same trend was evident when the tests were performed on PR microcell samples. While there was a small improvement with greater concentrations and cure times for the PDA/PVP samples, both PDA/PVP samples had twice as much adhesive strength as the state-of-the-art sealing methods, i.e., STD/PP.

Figure 9:
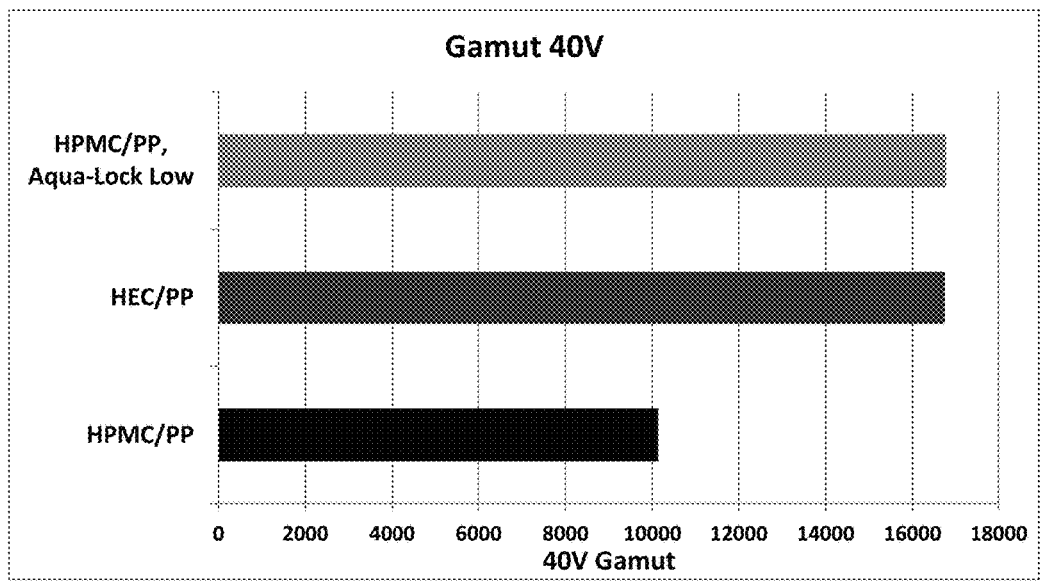
FIG. 9 shows the color gamut size for electrophoretic displays sealed with various polymer combinations described herein.

The test cells were additionally evaluated for color performance. FIG. 9 shows color gamut size when driving some of the test cells, described above, with a 40V waveform. As can be seen in FIG. 9, the microcell test strips coated with the PDA/PVP mixture and sealed with HPMC demonstrated marked improvement over microcells sealed with other compositions, e.g., HPMC, alone, or hydroxyethylcellulose (HEC). In particular, the color gamut for the PDA/PVP treated microcells was 1.7 times larger than the gamut for HPMC (alone) sealed test cells. Remarkably, the test cells coated with PDA/PVP exhibited improved display characteristics in addition to superior mechanical stability.

Figure 10A:
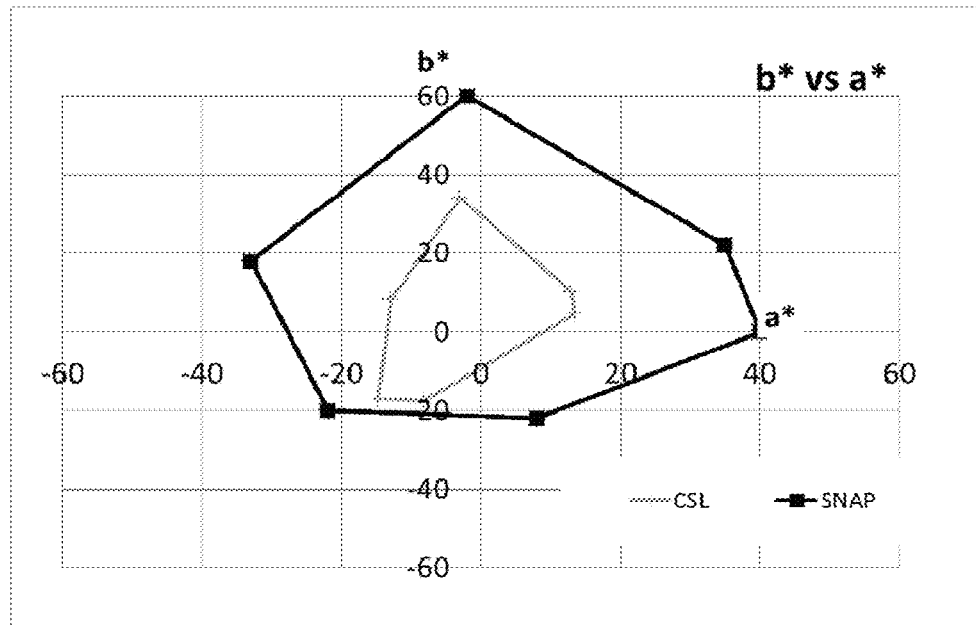
FIGS. 10A and 10B show changes in the color gamut for color electrophoretic displays sealed with different combinations of polymers.
Figure 10B:
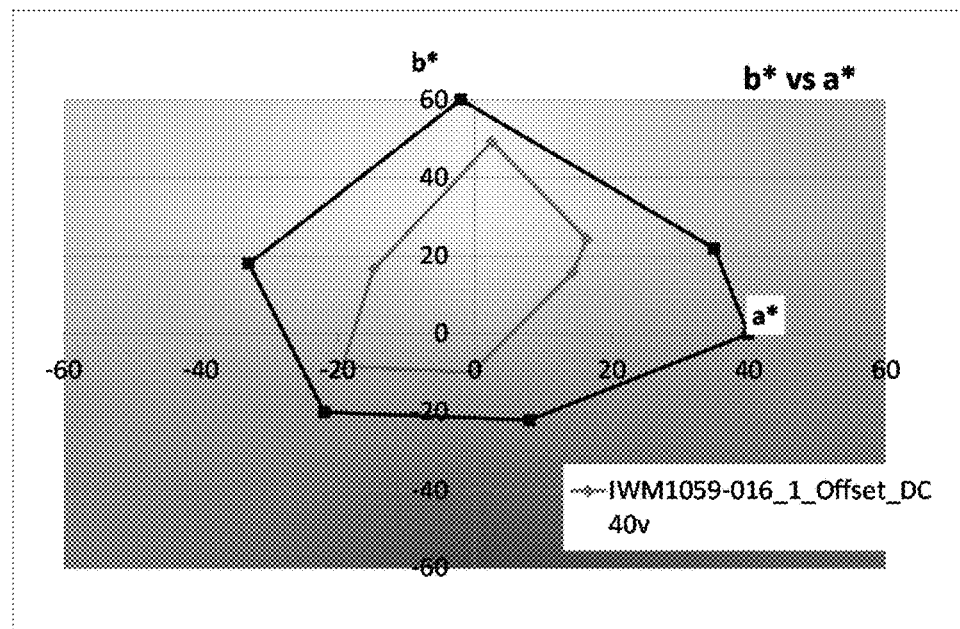

In addition to the improved gamut volume, the test cells coated with PDA/PVP and sealed with HPMC showed better symmetry in the a* vs. b* color gamut as shown in FIGS. 10A and 10B. Comparing gamut plots of uncoated (HPMC only) microcells (FIG. 10A) to gamut plots of test cells coated with PDA/PVP and sealed with HPMC (FIG. 10B), it is clear that the color range and the symmetry of the test cells with PDA/PVP is better. In particular, the yellow and red points in the a*b* plot for the PDA/PVP-sealed microcells are closer to their targets, thereby broadening the gamut and increasing the gamut symmetry by stretching it towards the upper-right quadrant of the a*b* plot. In comparison, the HPMC-only sealed devices have a gamut centered towards the lower left quadrant. This difference in color symmetry was also visible to the naked eye as a better balance between red and yellow colors in test patterns (not shown).

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of sealing a fluid within a container, comprising:
   providing a container having an opening;
   contacting the opening with a first mixture comprising a phenethylamine and a first polymer, thereby creating a coating at the opening;
   adding a fluid to the container;
   contacting the opening with a second mixture, comprising a second polymer, wherein the first and second polymers interact to seal the container.

2. The method of claim 1, wherein the phenethylamine is dopamine, epinephrine, phenylephrine, norepinephrine, 3,4-dihydroxyphenylalanine, or 3,4-dihydroxyphenylacetic acid.

3. The method of claim 1, wherein the first polymer is swellable.

4. The method of claim 3, wherein the swellable polymer is selected from the group consisting of pyrrolidones, polysaccharides, collagen, polyamides, polyesters, acrylates, polyurethanes, polyethers, and polyvinyl alcohols.

5. The method of claim 1, wherein the first mixture has a pH of greater than 7.

6. The method of claim 1, wherein the second polymer is hydrophilic.

7. The method of claim 6, wherein the second polymer is selected from cellulose, methylcellulose, polyethylene glycol, polyvinyl alcohols, acrylics, polyurethanes, and acrylamides.

8. The method of claim 1, wherein the container is constructed from acrylates, (meth)acrylates, vinylethers, esters, epoxides, polyethylene terephthalate (PET), high-density polyethylene (HDPE), polypropylene (PPE), polyvinyl chloride (PVC), or cellulose.

9. The method of claim 1, wherein the container is a microcell, a delayed release drug formulation, a chemical sensor, or a blister pack.

10. The method of claim 1, further comprising contacting the opening with a covering having a coating comprising the phenethylamine and the first polymer.

11. The method of claim 1, wherein the fluid is a hydrophobic mixture.

12. The method of claim 11, wherein the hydrophobic mixture comprises charged pigments.

13. The method of claim 1, wherein the second mixture contacts the fluid.

14. The method of claim 1, further comprising pretreating the container with a process selected from chemical cleaning, chemical etching, electron beam irradiation, ion beam irradiation, or plasma etching.

15. The method of claim 1, further comprising drying the first and second mixtures.

16. The method of claim 15, wherein drying comprises heating or exposing to a dessicant.

17. The method of claim 1, further comprising laminating a release sheet to the sealed container.

18. The method of claim 1, further comprising attaching an electrode to the container after the container is sealed.

19. The method of claim 1, wherein the phenethylamine is of Formula I:

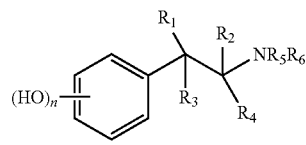

Wherein n is 1 or 2, provided that if n is 2, the hydroxyl groups coupled to the aromatic ring are ortho to each other, and wherein each of $R_1$, $R_2$, $R_3$, $R_4$, $R_5$, and $R_6$ is independently selected from the group consisting of a thiol, a primary amine, a secondary amine, a nitrile, an aldehyde, an imidazole, an anazide, a halide, a hydrogen, a hydroxyl, a carboxylic acid, an aldehyde, a carboxylic ester or a carboxamide.

* * * * *